(12) United States Patent
Smoot et al.

(10) Patent No.: US 7,673,000 B2
(45) Date of Patent: Mar. 2, 2010

(54) EMAIL SERVICE

(75) Inventors: Phil Smoot, San Francisco, CA (US);
William R. Hoffman, Berkeley, CA (US)

(73) Assignee: Microsoft Corporation, Redmond, WA (US)

( * ) Notice: Subject to any disclaimer, the term of this patent is extended or adjusted under 35 U.S.C. 154(b) by 1248 days.

(21) Appl. No.: 10/424,378

(22) Filed: Apr. 28, 2003

(65) Prior Publication Data

US 2004/0212639 A1 Oct. 28, 2004

(51) Int. Cl.
*G06F 15/16* (2006.01)
(52) U.S. Cl. ........................ 709/206; 709/201
(58) Field of Classification Search .......... 709/206, 709/201
See application file for complete search history.

(56) References Cited

U.S. PATENT DOCUMENTS

| | | | |
|---|---|---|---|
| 5,193,110 A | | 3/1993 | Jones et al. |
| 6,073,165 A | * | 6/2000 | Narasimhan et al. ........ 709/206 |
| 6,134,313 A | * | 10/2000 | Dorfman et al. ....... 379/201.01 |
| 6,167,402 A | * | 12/2000 | Yeager ........................ 707/10 |
| 6,978,396 B2 | | 12/2005 | Ruuth et al. |
| 7,020,779 B1 | * | 3/2006 | Sutherland .................. 713/185 |
| 2002/0112008 A1 | * | 8/2002 | Christenson et al. ........ 709/206 |
| 2008/0189361 A1 | | 8/2008 | Greschler et al. |

OTHER PUBLICATIONS

RFC 2076 "Common Internet Message Headers" 1997, Stockhom University, pp. 1-27.*
RFC 822 "Standard for the format of ARPA Internet text messages" 1982, Unisversity of Delaware, pp. 1-47.*
RFC 2822 "Internet Message Format" 2001, Qualcomm Incorporated, pp. 1-51.*

* cited by examiner

*Primary Examiner*—Larry D Donaghue
*Assistant Examiner*—Karen C Tang
(74) *Attorney, Agent, or Firm*—Lee & Hayes, PLLC

(57) ABSTRACT

An email having a header and a message is processed by an email service to store the header in a plurality of attached storage devices that are each in communication with one of a respective plurality of header host computing devices. The email service stores the message in a separate file in a plurality of attached storage devices that are each in communication with one of a respective plurality of message host computing devices.

27 Claims, 6 Drawing Sheets

EMAIL SERVICE

TECHNICAL FIELD

This invention relates to electronic mail (email) services.

BACKGROUND

Communications by electronic mail (email), once a luxury, are now a modem necessity. Current email storage systems store email for a large number of users on a single computer. If this single computer fails, a large number of those users cannot access their email. After the failure, a recovery process must be put in place to restore a large amount of email related data in the storage system of the single computer. The recovery process requires down time of the single computer which can be too lengthy to be acceptable to the email users of an email service. An absence of redundancy in email related data in the storage system prevents robust error recovery and permits one or more single points of failure in the architecture of the storage system. However, for very large volume email processing systems, redundancy must be accomplished in as efficient a manner as possible.

Accordingly, there is a continuing need for an improved email service.

SUMMARY

An electronic mail (email) is processed by an email service that stores a header in a first database host, log ships the header to a second database host, and stores a message corresponding to the header in a plurality of message file server hosts. Sets of headers in the first and second database hosts act as respective indices to sets of messages in the message file server hosts. When the email service receives a request to retrieve the email, the email service retrieves the header from the first database host, retrieves the message from one of the message file server hosts, and sends the email to the requestor. When the email service receives a request to delete the email, the email service stores the request to delete the email in a table and deletes the header from first and second database hosts. An asynchronous process deletes the message in each of the message file server hosts, and removes the request to delete the email from the table.

DETAILED DESCRIPTION

The disclosed subject matter describes implementations of various environments in which an electronic mail (email) service communicates via a network with a plurality of email senders and email recipients, where the email service processes email data in a storage system architecture that includes email header storage separate from email message storage. The storage system architecture of the email service uses redundancy in email related data to permit robust error recovery and eliminates single points of failure. The following discussion assumes that the reader is familiar with email and with the RFC 2822 and RFC 822 standards.

Exemplary Environment

Figure 1:
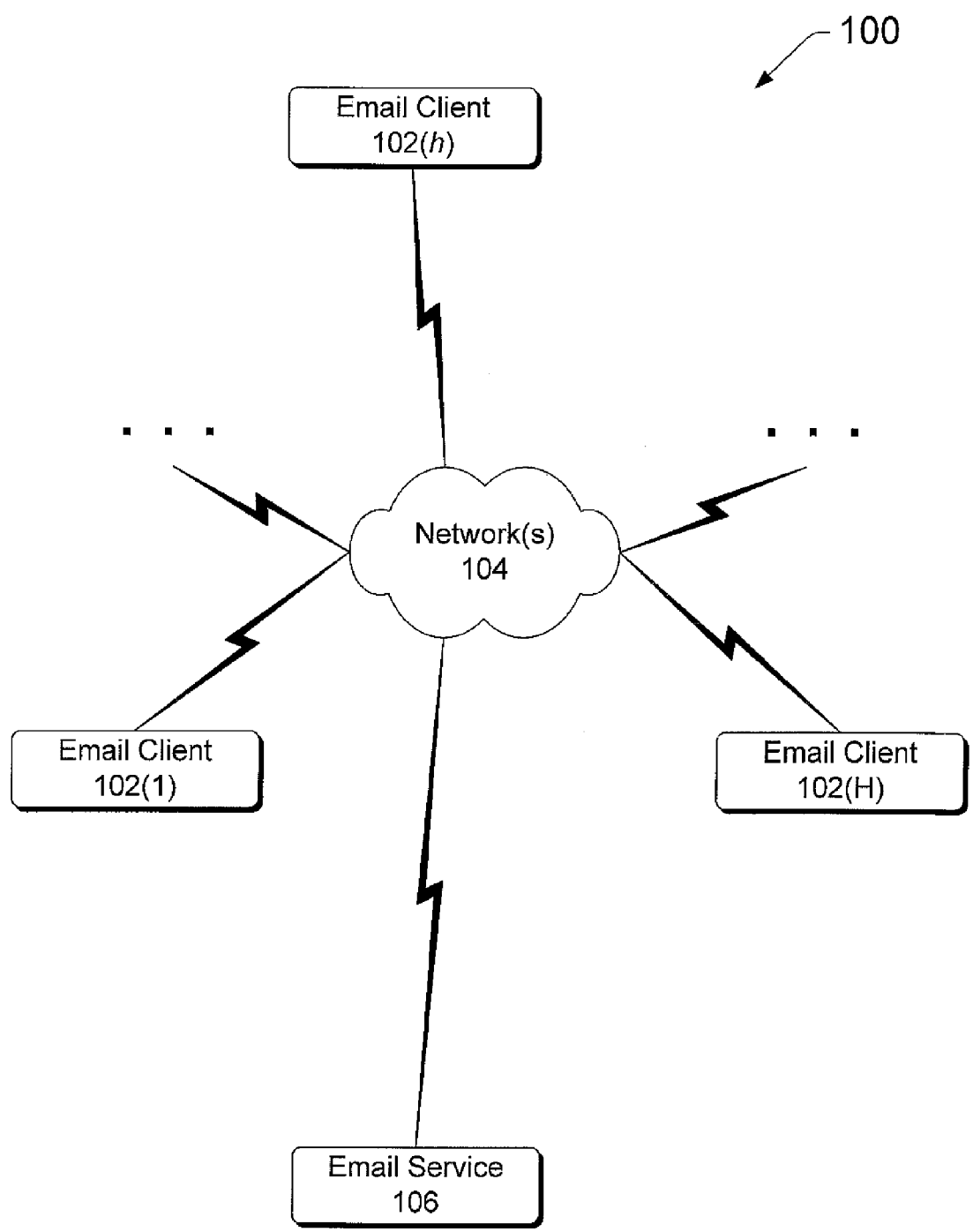
FIG. 1 illustrates an environment in which an implementation of an electronic mail (email) service communicates via a network with a plurality of email senders and email recipients.

FIG. 1 shows an exemplary environment 100 in which an email service 106 can be implemented. The email service 106 is illustrated as being in communication with one or more network(s) 104. Each network 104 can be a distribution network (e.g., satellite network, intranet, Internet). Email service 106 coordinates and accommodates the sending and the receiving of email among and between a plurality of email senders and receivers. In FIG. 1, the plurality of email senders and receivers are represented by email clients 102 (1-H) and individually as email client 102($h$). The email client 102($h$) can be implemented in many forms, including as a personal computer (PC), a set top box (STB) or cable receiver, a satellite receiver, or other device that offers access to an email service.

Each email that is transmitted through the network(s) 104 includes an email header and an email message. Additionally, various content can be sent with each email, such as in an attachment to the email. The content can be embodied in many forms, including video, audio, text, graphics, and so forth. In the illustrated implementation, the email client 102($h$) outputs a display of accessible content for viewing by a user.

The header of each email is defined to be a set of metadata corresponding to the RFC 2822 content of the email. When the email is compliant with the RFC 2822 standard, then some of the metadata can be extracted from the message itself, whereas other metadata can be sourced independently of the message itself. The header acts as an index into a mailbox for an email sender or receiver (e.g., a user). By way of example, a header can be stored in a table for a database management system (DBMS) that can respond to queries from the email client 102($h$), where the queries are formatted in a language that is compatible with the DBMS. The DBMS can be, for instance, a database management product from the Sybase Corporation of Emeryville, Calif., or from the Microsoft Corporation of Redmond, Wash. As such, the DBMS can use a client-server DBMS product referred to as a "SQL Server".

Each header can be stored as a row in a header table. A header row can include a variety of information about a corresponding message in an account corresponding to a particular user. This information can include a name of a folder that currently contains the message. The header table can contain enough data such that a folder view of the corresponding email can be rendered from fields in the header table, such as an identity of the sender of the email, a subject of the email, a date that the email was received, a size of the message of the mail, email recipient preferences, email folder hierarchy data, rules for filtering email messages, etc.

The information about a corresponding message in the user's account can also include a message identifier (ID) that uniquely identifies the message in a message file, were the message ID includes a system time and/or a sequence number. The name of the sender of the email can also be in the information, as well as the date that the message was received, the subject of the message, the length of the message, and the email address of the sender. The message of each email can be thought of as the payload of the email. An example of a message is an RFC 822 MIME message. The header information can also include the type of email, an importance indicator, a sensitivity indicator, conversation threading, etc.

Email Service Storage System Architecture

Figure 2:
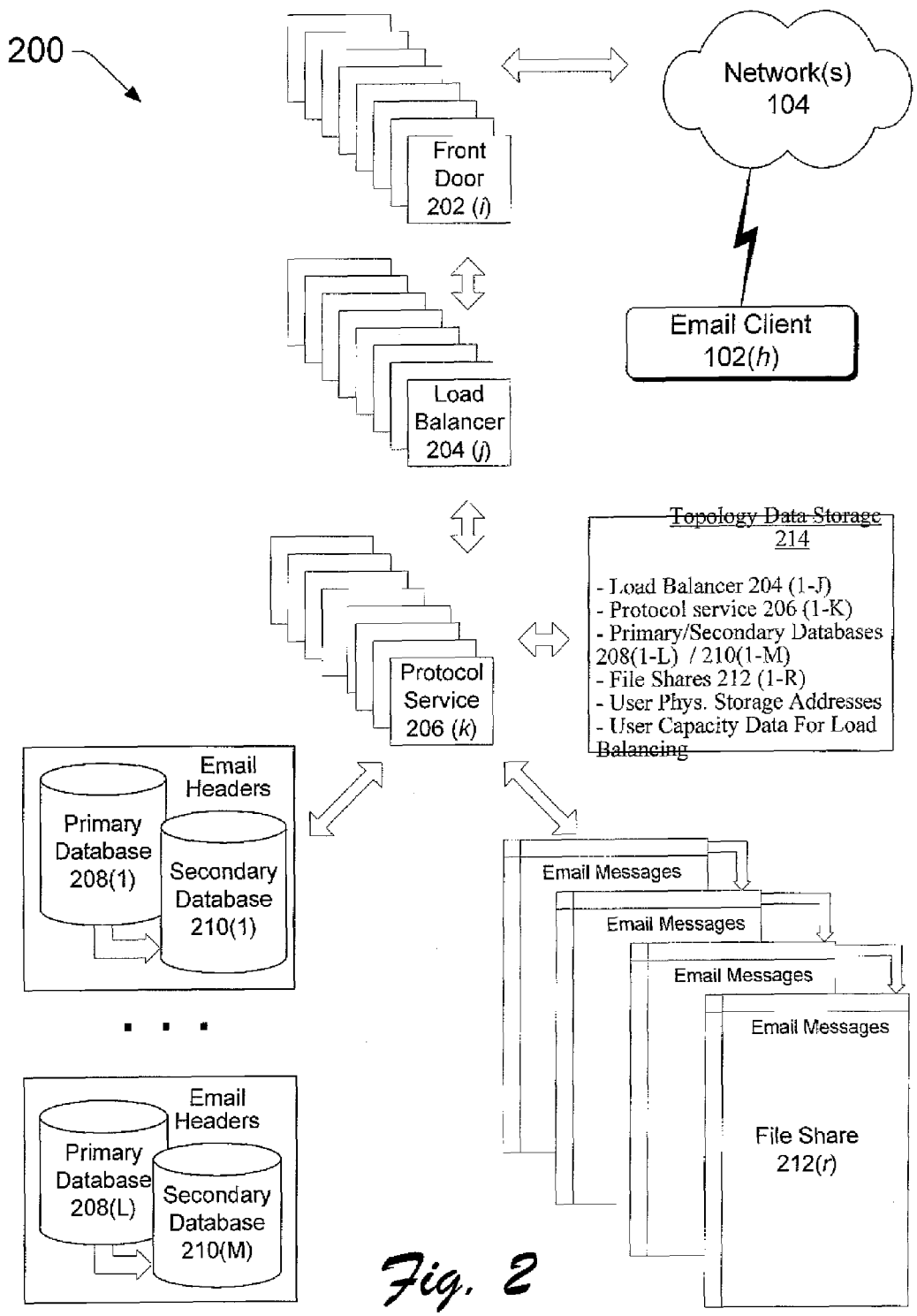
FIG. 2 illustrates an environment in which an implementation of an email service processes email data in a storage system architecture that includes email header storage that is separate from email message storage.

FIG. 2 shows selected components of the email service 106 of FIG. 1 in more detail, and as are particularly illustrated in an environment 200 in which an email service processes email data in a storage system architecture. The storage system architecture provides communications among the illustrated selected components of FIG. 2 via one or more networks 104. These selected components include one or more front doors 202(i), one or more load balancers 204(j), one or more protocol services 206(k), one or more primary databases 208(l), one or more secondary databases 210(m), one or more file shares 212(r), and a topological data storage 214. Each of the primary database 208(l), the secondary database 210(m), and the file share 212(r) can be a computing device for hosting a database. Each of the selected components is discussed below.

The email client 102(h) exchanges data with the storage system architecture via a communication protocol that accesses one of the front doors 202(i). Rather than permitting email client 102(h) to directly connect to the storage system architecture, the email client 102(h) can locate user data via a lookup that indicates a storage location for email related data that pertains to the email client 102(h). The lookup of the storage location can be performed by receiving an email at one of the front doors 202(i). The front door 202(i) stores information with respect to a plurality of users. The front door 202(i) determines, from a unique identifier for a particular user that is included with the email, whether the user exists within the email service. When the particular user is found to exist within the email service, the email can be sent from the front door 202(i) to one of the load balancers 204(j). As such, the storage location determined by the lookup will directly map to one of the load balancers 202(i) that is in front of the bank of protocol services 206(k). The looked up storage location also maps to a particular grouping of the users. Each group of users corresponds to one of the primary databases 208(l) and to one of the secondary databases 210(m). Each group of users also corresponds to at least one of the file shares 212(r). For instance, email data can be stored in two or more places for higher availability for some, but not all, of the groups of users. In such cases, those groups can have their email data replicated on more than one file share 212(r). This replication gives users in those group higher availability to their email related data with respect the users that do not have their email data replicated. Thus, the architecture of the present invention enables a service provider to offer different classes of service to different users.

The storage system architecture depicted in FIG. 2 is organized into clusters. At the top of each cluster is a piece of networking hardware that is referred to herein as the load balancer 204(j). The load balancer 204(j) distributes email-related requests over a set of servers that are represented in FIG. 2 as protocol services 206 (1-K). Each protocol service 206(k) can include a stateless server that implements a particular communication protocol. A farm of these stateless servers can be located behind each load balancer 204(j). As such, the load balancer 204(j) can-be used to distribute requests pertaining to the email client 102(h) over a farm of stateless servers which are represented in FIG. 2 as protocol services 206 (1-K). Each protocol service 206(k) can parse each such request, such as by separating the header and the message that are in an email contained in a request received from email client 102(h). The protocol service 206(k) can obtain and store information that has been communicated from the topological data storage 214. This information includes configurable values such as port assignments, the number of sockets per server, worker threads, buffer sizes, and the location and connection information for the various components of the storage system architecture such as are seen in FIG. 2. The location and connection information received from the topological data storage 214 may also include information about the load balancers 204 (1-J), the protocol services 206 (1-K), the primary databases 208 (1-L), the secondary databases 210 (1-M), and the file shares 212 (1-R) that are behind one of the load balancers 204 (1-J). Also, the location and connection information can include the respective physical storage address of each user, and user capacity data that is useful for performing load balancing analysis with the load balancers 204 (1-J).

The storage system architecture can be expanded or contracted to accommodate additional email clients 102. This expansion and contraction can be performed by respectively adding and taking away one or more of the protocol services 206, the primary databases 208, the secondary databases 210, and the file shares 212 that are behind one of the load balancers 204(j).

The primary databases 208 (1-L) and the secondary databases 210 (1-M) are used to store the header of an email. One of the protocol services 206(k) is used to insert, retrieve, modify and delete the header within one of the primary databases 208(l). Once the header has been located to the primary database 208(l), the header can be replicated from the primary database 208(l) to one of the secondary databases 210(m) via a log shipping transaction. By implementation of the log shipping transaction, the storage system architecture provides a "hot" primary database 208(l) and a "warm" secondary database 210(m) that serves as a backup. The recovery or promotion of "warm" backups can be either an automatic or a manual process. Other backups and replication of headers are also contemplated, such as providing a third and fourth database (not shown) to which the header stored in the primary database 208 would be similarly replicated, such as by a log shipping process.

Each file share 212(r) is to contain message files, where there is only one message is each message file. Advantageously, the use of a separate file for each message removes problems with message data being locked out from access thereto. Also, the message files lend themselves to simple procedures to implement redundancy, such as by copying.

Transaction consistency can be maintained between the header and the message in the storage system architecture. On delivery of an email, the header is inserted by one of the protocol services 206(k) into one of the primary databases 208(l) with an indicator of a transaction state of "not committed", or the like. Next, the message corresponding to the header is written by the protocol service 206(k) to one of the file shares 212(r). If the message was written successfully, the indicator of the transaction state for the header is updated with a transaction state of "committed", or the like, to confirm the successful writing. The message may then be replicated in the other file shares 212 so as, to provide for a redundant storage design.

Advantageously, having many processing instances behind each load balancer 204(j) offers fault tolerance so that a failure of one (1) node does not bring down the whole storage system architecture. Also, the protocol services 206 (1-K) provide a mechanism to govern and pool the number of back-end connections that are made to the primary databases 208, the secondary databases 210, and to the file shares 212. Moreover, the storage of the headers separate from the storage of the messages allows for the individual and respective scaling of each of the primary databases 208, the secondary databases 210, and the file shares 212.

Figure 3:
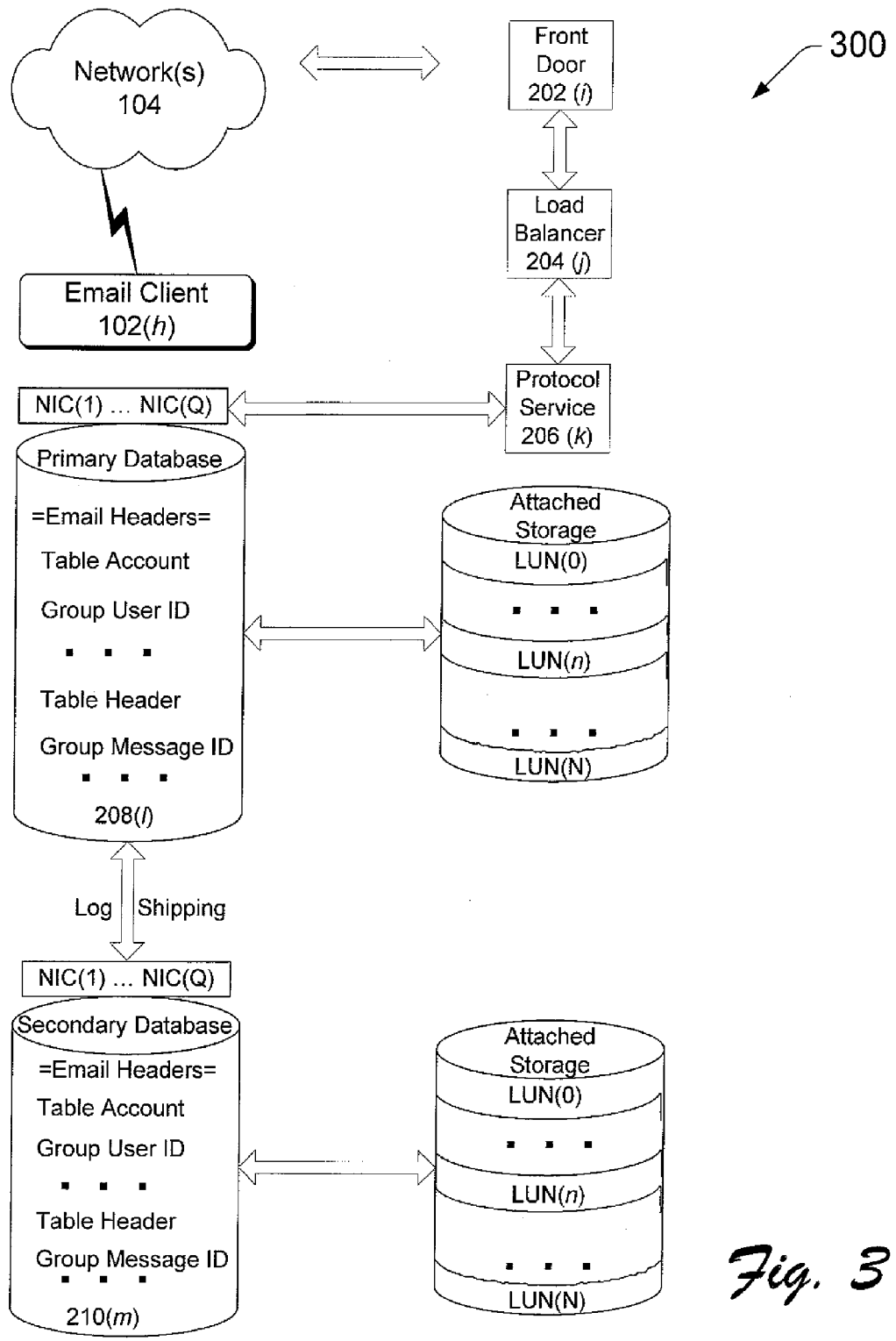
FIG. 3 further illustrates a portion of the environment of FIG. 2 in which the email service processes email header data in the email header storage of the storage system architecture.

Referring now to FIG. 3, a portion of the environment 200 of FIG. 2 is shown by an environment 300, where email related requests can be processed as illustrated. In particular, an email related request is received from the email client 102(h) at the front door 202(l) that stores information about a plurality of users. A unique identifier for one of the users is included with the email. The unique identifier and the user information that are stored at the front door 202(l) are used by the front door 202(l) to determine whether the user exists. If so, then the front door 202(l) forwards the email related request to one of the load balancers 204(j). The load balancer 204(j) coordinates the execution of a load balancing algorithm and forwards the email related request to one of the protocol services 206(k) that has been determined to be available based upon the results of the load balancing algorithm. The protocol service 206(k) can be a database host having local storage such that the protocol service 206(k) is stateless, not having an attached storage.

The protocol service 206(k) retrieves an address for each of the primary database 208(l), the secondary database 210(m), and each file share 212(r) that pertains to email-related data for the user designed in the email related request. The protocol service 206(k) communicates with the respective address of each of the primary database 208(l), the secondary database 210(m), and each file share 212(r). This communication is performed using one of a plurality of respective network interfaces, such as can be provided by a Network Interface Card (NIC) (1-Q). Each NIC provides an interface for each of the primary database 208, the secondary database 210, and each file share 212 to the one or more networks 104. Advantageously, redundant NICs are provided for each of the primary database 208, the secondary database 210, and each file share 212, thereby allowing for error recovery in case one of the NICs fails. On a given host, each NIC is configured to be on a different physical network. Advantageously, redundant NICs allow for error recovery in case one of the networks fails, for example if a network switch fails.

The NIC serves as a conduit to pass instructions from the protocol service 206(k) to perform an operation at the primary database 208(l) as dictated by the email related requests. The operation can be an insertion of a header, a retrieval of a header, a modification of a header, or a deletion of a header. The primary database 208(l), as seen in FIG. 3, can store various email information including the respective headers of emails. This email information can also include a table account of email headers, an identifier for a group of users pertaining to the email headers that are stored at the primary database 208(l), a table header for the email headers, and an identifier for a group of messages for a group of users to which the email headers pertain.

The primary database 208(l) can be a header database host computing device that is in communication with an attached storage device that includes Logical Units (LUN) (0-N). The primary and secondary databases 208, 210 are also referred to herein as header database host computing devices, header host computing devices, and as header database hosts. The attached storage device will preferably be a mass storage device but can also be a fixed storage device. Each LUN in the attached storage can be used to store header related data for email for one of a group of users.

Once header related data is stored at the primary database 208(l) and its attached storage, a log shipping transaction replicates the same in the secondary database 210(m) and its corresponding attached storage. As such, the secondary database 210(m) can be a "warm" server for the primary database 208(l). As mentioned above, further equivalent replications of the header can also be performed, if so desired. For example, further equivalent replications can be made to third and fourth databases (not shown), such as by additional log shipping transactions.

Primary databases 208 (1-L) and secondary database 210 (1-M) can be regarded as respective server farms. Each such server farm can be made up of host computing devices that each host a database that is stored on an attached storage device that includes Logical Units (LUN) (0-N).

Figure 4:
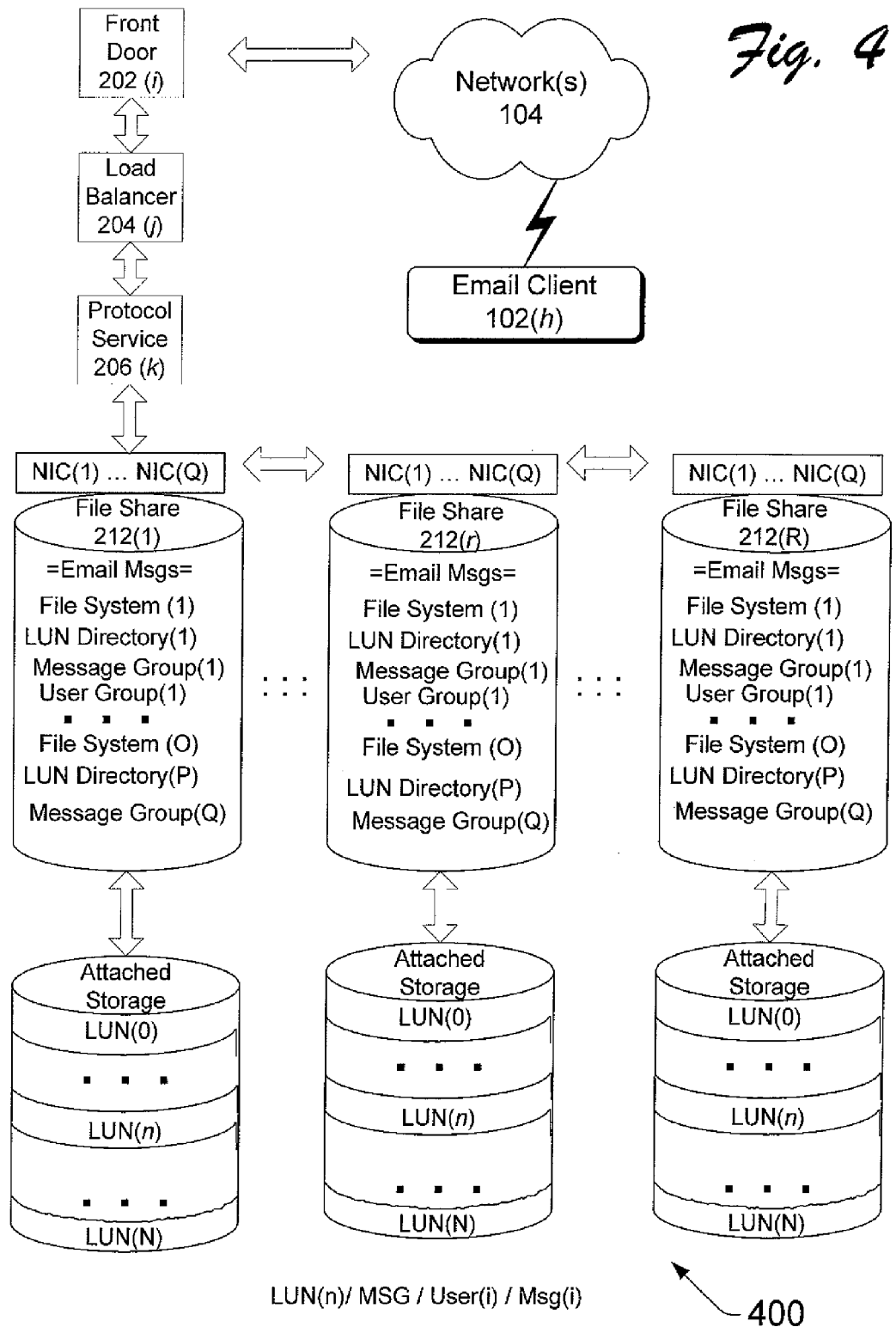
FIG. 4 further illustrates a portion of the environment of FIG. 2 in which the email service processes email message data in the email message storage of the storage system architecture.
Figure 5:
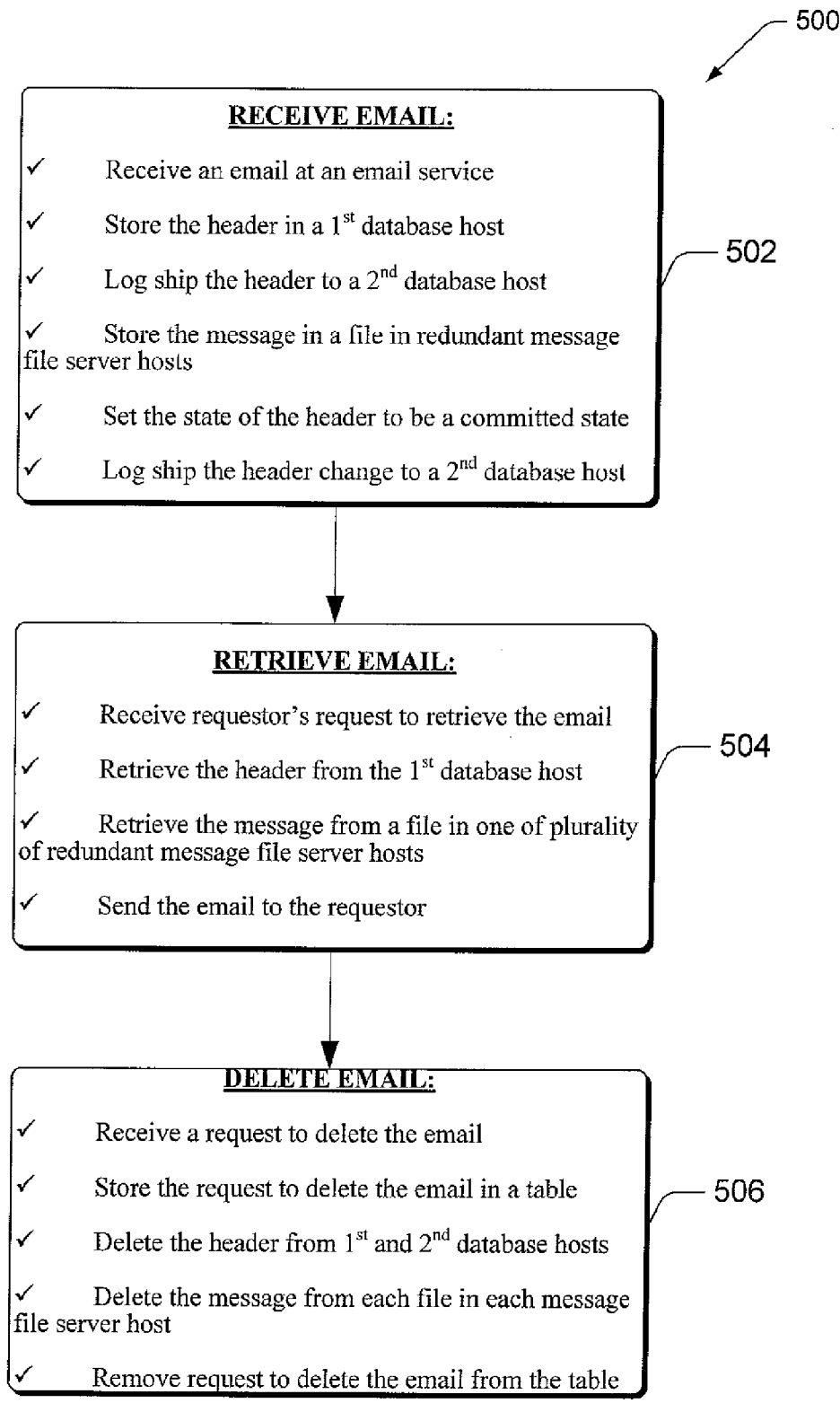
FIG. 5 is a flow diagram of an implementation of an email service process in which email data is stored in a storage system architecture that can be implemented by the environment of FIG. 2.

Referring now to FIG. 4, a portion of the environment 200 of FIG. 2 is shown by an environment 400, where an email related request can be processed as illustrated. Similar to the description provided above with respect to FIG. 3, the email related request is received at the front door 202(l), forwarded to the load balancer 204(j), and then forwarded on to one of the protocol services 206(k). The protocol service 206(k) communicates with one of a plurality of NICs (1-Q), each providing an interface to the one or more networks 104 and allowing for error recovery in case one of the NIC fails or in case one of the networks fails.

The NIC passes instructions from the protocol service 206 (k) to perform an operation at each file share 212(r) as dictated by the email related request. The operation can be an insertion of a message into a file, a retrieval of a message from a file, a modification of a message in a file, or a deletion of a message in a file. Each of the file shares 212 (1-R) is in communication with an attached storage device that includes Logical Units (LUN) (0-N). The attached storage device will preferably be a mass storage device but can also be a fixed storage device. The attached storage device can be configured so that the protocol service 206(k) will store the message of an email in one file in the LUN (n). As such, the protocol service 206(k) will ensure that each message is in a separate file in the LUN (n). Accordingly, each file in the LUN (n) will contain just one message.

Each file share 212(r) can include a variety of information that pertains to the message of an email. This information, which can be stored in file systems (1-O) and LUN directories (1-P) of the attached storage, can include a message group to which messages from respective email pertain and a group of users to which the email pertains. File shares 212 (1-R) can be regarded as a server farm made up of message file server host computing devices each hosting a file system that is stored on an attached storage device that includes Logical Units (LUN) (0-N). The file shares 212 (1-R) are also referred to herein as message file server host computing devices, message file server hosts, and as message hosts computing devices.

In reference to FIGS. 2-4, FIG. 5 depicts a process 500 in which an email service processes email related data in a storage system architecture that includes header storage in the primary databases 208 (1-L) and the secondary databases 210 (1-M) (e.g., $1^{st}$ and $2^{nd}$ database hosts) and message storage in the file shares 212 (1-R) (e.g., message file server hosts). An implementation is shown by block 502 of process 500 in which an email is being sent to the email service. At block 502, the processing of the email includes receiving the email, storing its header in one of the primary databases 208($l$), replicating its header from the primary database 208($l$) into a secondary database 210($m$), replicating the message of the email into each of the file shares 212 (1-R), and committing the header. There is a logical and physical difference in respective addresses between each of the primary databases 208 (1-L), the secondary databases 210 (1-M), and each of the file shares 212 (1-R).

An implementation is shown by block 504 of process 500 in which an email client 102($h$) makes a request to retrieve the email that had been previously received and stored by the email service. The processing of the request includes receiving the request at one of the front doors 202($i$). The front door 202($i$) has stored information about the users of the email service and uses a unique identifier for the requesting user, which is included with the request, to determine whether the requesting user exists. If so, then the request is sent from the front door 202($i$) to one of the load balancers 204($j$). The load balancer 204($j$) performs a load balancing analysis to determine which server in a server farm to send the request to. This analysis is used to select one of the protocol servers 206($k$) that is to receive the request to retrieve the email. The protocol server 206($k$) receives the request from the load balancer 204($j$). The protocol server 206($k$) retrieves addresses that correspond to the email-related data of a requesting user for each of the primary database 208($i$) and each file share 212($r$). These addresses are used by the protocol server 206($k$) to access the primary database 208($l$) and to access at least one of the file shares 212($r$) to respectively retrieve the header and the message corresponding to the requested email. The access is made to the primary database 208($l$) using data that is included in the request. The access that is made to one of the file shares 212($r$) can use data in the retrieved header to retrieve the message in the file share ($r$) that corresponds to the requested email.

An implementation is shown by block 506 of process 500 in which an email client 102($h$) makes a request to delete the email that had been previously received and stored by the email service. The processing of the request includes receiving the request to delete the email and storing the request in a table. An access is made, using data that is contained in the request, by the protocol service 206($k$) to one of the primary databases 208($l$) and to one of the secondary databases 210 ($m$). This access then deletes the header corresponding to the email from the corresponding primary and secondary databases 208($l$), 210($m$). An access is also made by the protocol service 206($k$) to each file share 212 (1-R), using the request in the table, to delete the message corresponding to the email. After these deletions have been successfully made, the request is removed from the table. The foregoing represents an asynchronous process for the deletion of a message of an email in each message file server host (e.g., file share) and for the removal of a request to delete the email from a table.

In various implementations, the protocol services 206 (1-K) perform various email-related functions, including the storing of a header, the storing of a message, and the replicating of a message. A messaging protocol is used by each protocol service 206($k$) to maintain consistency in email header data between the primary databases (1-L) and the secondary databases (1-M).

Exemplary Computing System and Environment

Figure 6:
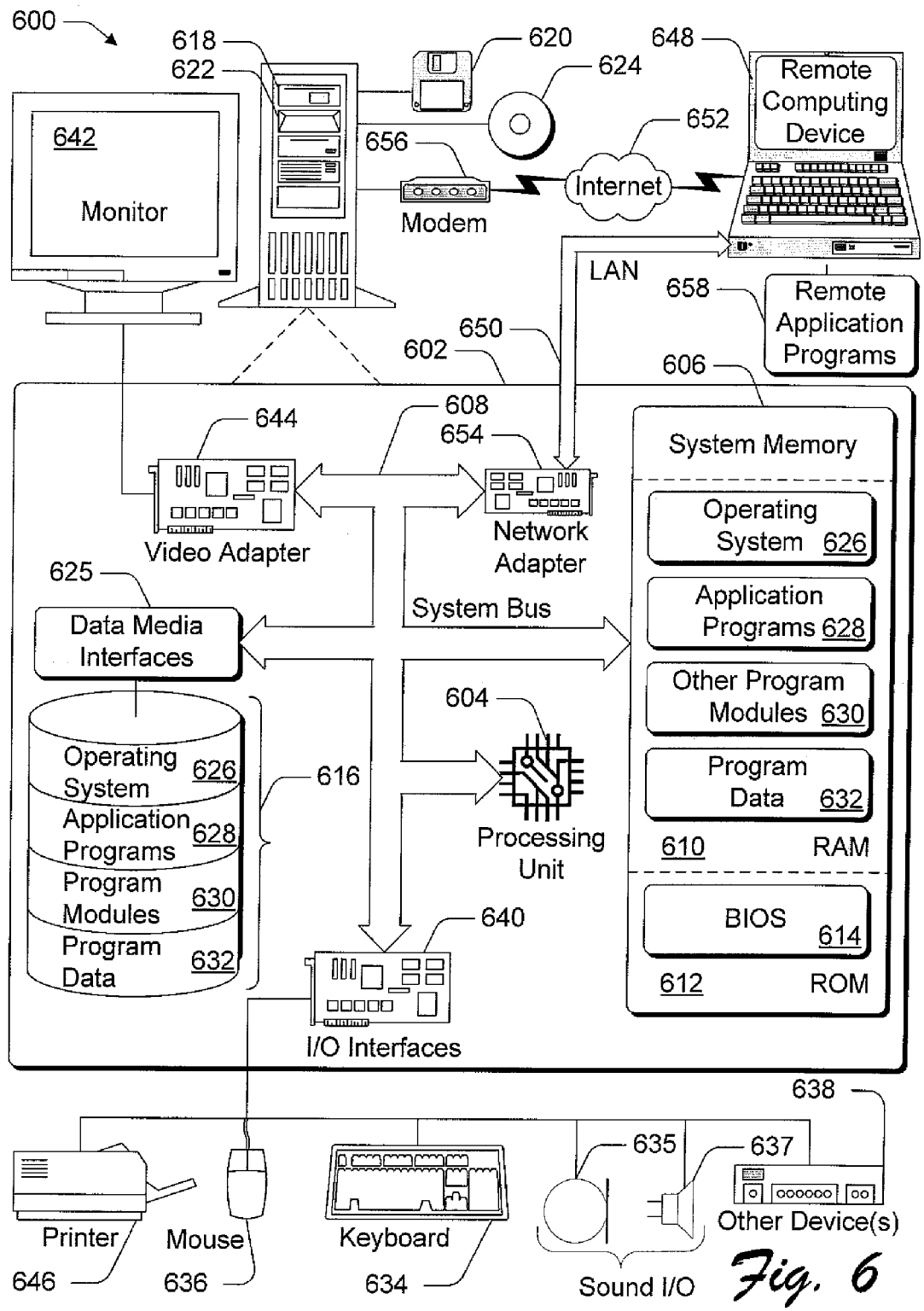
FIG. 6 illustrates an example of a computing environment within which the computing devices, software applications, transmissions, computer readable medium, methods and systems described herein can be either fully or partially implemented.

FIG. 6 illustrates an example of a computing environment 600 within which the applications, including those intended to be implemented with respect to email clients 102 (1-H), primary databases (1-L), secondary databases (1-M), file shares (1-R), described herein can be either fully or partially implemented. Exemplary computing environment 600 is only one example of a computing system and is not intended to suggest any limitation as to the scope of use or functionality of the network architectures. Neither should the computing environment 600 be interpreted as having any dependency or requirement relating to any one or combination of components illustrated in the exemplary computing environment 600.

The computer and network architectures can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, gaming consoles, distributed computing environments that include any of the above systems or devices, and the like.

The applications, including those intended to be implemented with respect to email clients 102 (1-H), primary databases (1-L), secondary databases (1-M), file shares (1-R), may be described in the general context of computer-executable instructions, such as program modules, being executed by a computer. Generally, program modules include routines, programs, objects, components, data structures, etc. that perform particular tasks or implement particular abstract data types. These applications may also be practiced in distributed computing environments where tasks are performed by remote processing devices that are linked through a communications network. In a distributed computing environment, program modules may be located in both local and remote computer storage media including memory storage devices.

The computing environment 600 includes a general-purpose computing system in the form of a computer 602. The components of computer 602 can include, but are not limited to, one or more processors or processing units 604, a system memory 606, and a system bus 608 that couples various system components including the processor 604 to the system memory 606.

The system bus 608 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer system 602 typically includes a variety of computer readable media. Such media can be any available media that is accessible by computer 602 and includes both volatile and non-volatile media, removable and non-removable media, and media that is stored in mass storage. The system memory 606 includes computer readable media in the form of volatile memory, such as random access memory (RAM) 610, and/or non-volatile memory, such as read only memory (ROM) 612. A basic input/output system (BIOS) 614, containing the basic routines that help to transfer information between elements within computer 602, such as during start-up, is stored in ROM 612. RAM 610 typically contains data and/or program modules that are immediately accessible to and/or presently operated on by the processing unit 604.

Computer 602 can also include other removable/non-removable, volatile/non-volatile computer storage media. By way of example, FIG. 6 illustrates a hard disk drive 616 for reading from and writing to a non-removable, non-volatile magnetic media (not shown), a magnetic disk drive 618 for reading from and writing to a removable, non-volatile magnetic disk 620 (e.g., a "floppy disk"), and an optical disk drive 622 for reading from and/or writing to a removable, non-volatile optical disk 624 such as a CD-ROM, DVD-ROM, or other optical media. The hard disk drive 616, magnetic disk drive 618, and optical disk drive 622 are each connected to the system bus 608 by one or more data media interfaces 625. Alternatively, the hard disk drive 616, magnetic disk drive 618, and optical disk drive 622 can be connected to the system bus 608 by a SCSI interface (not shown).

The disk drives and their associated computer-readable media provide non-volatile storage of computer readable instructions, data structures, program modules, and other data for computer 602. Although the example illustrates a hard disk 616, a removable magnetic disk 620, and a removable optical disk 624, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 616, magnetic disk 620, optical disk 624, ROM 612, and/or RAM 610, including by way of example, an operating system 626, one or more application programs 628, other program modules 630, and program data 632. Each of such operating system 626, one or more application programs 628, other program modules 630, and program data 632 (or some combination thereof).

Computer system 602 can include a variety of computer readable storage media identified as communication media and computer readable media. Communication media typically embodies computer readable instructions, data structures, program modules, or other data in a modulated data signal such as a carrier wave or other transport mechanism and includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable storage media.

A user can enter commands and information into computer system 602 via input devices such as a keyboard 634 and a pointing device 636 (e.g., a "mouse"). A microphone 635 can be used to input vocal command that can be subject to a voice recognition process for passing on the vocal input. Other devices 638 (not shown) can include mass storage, attached storage, a joystick, a game pad, a satellite dish, a serial port, a scanner, and/or the like. These and other such devices can be connected to the processing unit 604 via input/output interfaces 640 that are coupled to the system bus 608, but may be connected by other interface and bus structures, such as by one or more redundant network interface cards (NICs), a modem 696, a network adapter 654, a parallel port, game port, or a universal serial bus (USB).

A monitor 642 or other type of display device can also be connected to the system bus 608 via an interface, such as a video adapter 644. Input/output interfaces 640 can include a sound card, an integrated (e.g., on-board) sound card, etc. One or more speakers 637 can be in communication with input/output interfaces 640. In addition to the monitor 642, other output peripheral devices can include components such as a printer 646 which can be connected to computer 602 via the input/output interfaces 640.

Computer 602 can operate in a networked environment using logical connections to one or more remote computers, such as a remote computing device 648. By way of example, the remote computing device 648 can be a personal computer, portable computer, a server, a router, a network computer, a peer device or other common network node, and the like. The remote computing device 648 is illustrated as a portable computer that can include many or all of the elements and features described herein relative to computer system 602.

Logical connections between computer 602 and the remote computer 648 are depicted as a local area network (LAN) 650 and a general wide area network (WAN) 652. Such networking environments are commonplace in offices, enterprise-wide computer networks, intranets, and the Internet. When implemented in a LAN networking environment, the computer 602 is connected to a local network 650 via the network interface or adapter 654. When implemented in a WAN networking environment, the computer 602 typically includes the modem 656 or other means for establishing communications over the wide network 652. The modem 656, which can be internal or external to computer 602, can be connected to the system bus 608 via the input/output interfaces 640 or other appropriate mechanisms. It is to be appreciated that the illustrated network connections are exemplary and that other means of establishing communication link(s) between the computers 602 and 648 can be employed.

In a networked environment, such as that illustrated with computing environment 600, program modules depicted relative to the computer 602, or portions thereof, may be stored in a remote memory storage device. By way of example, remote application programs 658 reside on a memory device of remote computer 648. For purposes of illustration, application programs and other executable program components, such as the operating system, are illustrated herein as discrete blocks, although it is recognized that such programs and components reside at various times in different storage components of the computer system 602, and are executed by the data processor(s) of the computer.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method with computer readable instructions executable on a hardware processor, the method comprising:
   Implementing one or more of primary database devices, one or more plurality of secondary database devices, one or more file sharing devices and a topological data storage device for one or more email clients on a distribution network;
   wherein each email within the network includes an email header and an email message;

wherein the email header comprise a set of metadata corresponding to the RFC 2822 and the email header is an index use for the indexing the email message that is stores separately;

wherein the one or more primary database devices and the one or more secondary database devices are used to store plurality of the email headers;

wherein the one or more secondary database devices serve as a backup database of the one or more primary databases;

using a log shipping process to replicate email headers from at least one of the primary database devices to at least one of the secondary database devices to eliminate a single point of failure;

issuing at least one or more email-related requests by the one or more email clients;

executing, by a load balancer, a load balancing algorithm to forward at least one or more email-related requests and to select at least one or more stateless protocol servers available to ensure the one or more email-related requests are serviced;

each email-related requests include: an email, port assignments, number of sockets per server, worker threads, buffer sizes, physical storage address of each email client, and email client capacity data;

using each stateless protocol server to parse one or more email-related requests by separate the email header and the email message that are in each email contained in one or more email-related requests;

using each stateless protocol server to store the email header in the one or more primary database devices and to store the email message to one or more file share devices;

setting a state of the email header to a committed state as the email message is successfully written into the one or more file share devices; and retrieving addresses that correspond to the email-related request or a requesting email clients for each of the one or more primary database devices and each of one or more file share devices;

using the retrieving addresses by the one or more stateless protocol servers to access the one or more primary database devices and accessing one or more file share devices;

wherein maintaining at least two copies of the email headers on the at least one of the file share devices to ensure a higher availability for a specific group of email clients that have a particular class of service;

wherein the set of metadata in each email header includes data from a group consisting of a transaction state, a sender of the email, a subject of the email, a receipt date of the email, a size of the email message, an email recipient preference, email folder hierarchy data, a rule for filtering of the email message, an identification of an email recipient, a globally unique identifier of the email message, and a timestamp of when the email header was last modified;

wherein each said stateless protocol server using a messaging protocol by which consistency in email header is maintained between the one or more of primary database devices and one or more plurality of secondary database devices.

2. The method as defined in claim 1, wherein:
the email message and the email header both include a unique identifier for a recipient of the email.

3. A computer readable medium that includes a removable media in a form of a volatile memory and comprising computer readable instructions executed by one or more hardware processors, performs the method of claim 1.

4. A method with computer readable instructions executable on a hardware processor, the method comprising:

implementing one or more of primary database devices, one or more plurality of secondary database devices, one or more file sharing devices and a topological data storage device for one or more email clients on a distribution network;

wherein each email within the network includes an email header and an email message;

wherein the email header comprises a set of metadata corresponding to the RFC 2822 and the email header is an index used for indexing the email message that is stored separately;

wherein the one or more primary database devices and the one or more secondary database devices are used to store plurality of the email headers;

wherein the one or more secondary database devices serve as a backup database of the one or more primary databases;

using a log shipping process to replicate email headers from at least one of the primary database devices to at least one of the secondary database devices to eliminate a single point of failure;

issuing at least one or more email-related requests by the one or more email clients;

executing, by a load balancer, a load balancing algorithm to forward at least one or more email-related requests and to select at least one or more stateless protocol servers available to ensure the one or more email-related requests are serviced;

each email-related request includes: an email, port assignments, number of sockets per server, worker threads, buffer sizes, physical storage address of each email client, and email client capacity data;

using each stateless protocol server to parse one or more email-related requests by separating the email header and the email message that are in each email contained in one or more email-related requests;

using each stateless protocol server to store the email header in the one or more primary database devices and to store the email message to one or more file share devices;

setting a state of the email header to a committed state as the email message is successfully written into the one or more file share devices;

retrieving addresses that correspond to the email-related request or a requesting email clients for each of the one or more primary database devices and each of one or more file share devices;

using the retrieving addresses by the one or more stateless protocol servers to access the one or more primary database devices and accessing one or more file share devices;

wherein maintaining at least two copies of the email headers on the at least one of the file share devices to ensure a higher availability for a specific group of email clients that have a particular class of service;

storing a header of an email in a primary database, wherein the header is stored separately from the message of the email;

replicating a message of the email into each of the plurality of file shares, wherein there is a logical and physical difference in respective addresses between each of the primary database, the secondary database, and each said file share; and rendering information from the header of the email, the header comprises an identity of a sender of the email, a subject of an email, a date the email was received, a size of a message of the email, email recipient preferences, email folder hierarchy data, and rules for filtering email messages;

wherein each said stateless protocol server uses a messaging protocol by which consistency in email header is maintained between the one or more of primary database devices and one or more plurality of secondary database devices.

5. The method as defined in claim 4, wherein:

the primary database and the secondary database each are in communication with an attached storage device in which the header of the email is stored separately from the message of the email; and each said file share is in communication with an attached storage device in which the message of the email is stored in its own separate file from the header of the email;

wherein storing the headers separately from the messages allows respective scaling of the databases and the separate file shares;

wherein storing the headers separately from the messages provides governing and pooling a number of backend connections made to the databases and to the separate file shares.

6. The method as defined in claim 4, further comprising:
storing a request to delete the email in a table;
accessing the primary and secondary databases, using the request, to delete the header corresponding to the email;
accessing each said file share, using the request in the table, to delete the message corresponding to the email; and
removing the request in the table.

7. The method as defined in claim 6, further comprising receiving the request to delete the email.

8. The method as defined in claim 4, further comprising:

receiving the email at one of a plurality of protocol servers, wherein the email includes a unique identifier for one of a plurality of users;

retrieving, at the one said protocol server, an address for each of the primary database, the secondary database, and each said file share, wherein the one said protocol server uses each said address to perform:

the storing of the header into an attached storage device in communication with the primary database at an address corresponding to the one said user;

the replicating the header from the attached storage device in communication with the primary database into an attached storage device in communication with the secondary database at an address corresponding to the one said user; and the replicating of the message from an attached storage device in communication with the file share into an attached storage device in communication with each of the plurality of said file shares at an address corresponding to the one said user.

9. The method as defined in claim 8, wherein each said protocol server is a database host having local, but not attached, storage.

10. The method as defined in claim 4, further comprising:

receiving the email at one of a plurality of front doors, wherein each said front door stores information about a plurality of users;

determining with the one said front door, from a unique identifier for one said user included with the email, whether the one said user exists; and when the determining finds that the one said user exists:
sending the email from the one said front door to one of a plurality of load balancers;

performing a load balancing analysis at the one said load balancer to determine one of a plurality of protocol servers to receive the email;

receiving the email at the one said protocol server;

retrieving, at the one said protocol server, an address for each of the primary database, the secondary database, and each said file share, wherein the one said protocol server uses each said address to perform:

the storing of the header into the primary database at an address corresponding to the one said user;

the replicating the header from the primary database into the secondary database at an address corresponding to the one said user; and the replicating of the message into each of the plurality of file shares at an address corresponding to the one said user.

11. A computer readable medium that is in a form of a volatile memory and comprising computer readable instructions executed by one or more hardware processors, performs the method of claim 4.

12. A method with computer readable instructions executable on a hardware processor, the method comprising:

implementing one or more of primary database devices, one or more plurality of secondary database devices, one or more file sharing devices and a topological data storage device for one or more email clients on a distribution network;

wherein each email within the network includes an email header and an email message;

wherein the email header comprises a set of metadata corresponding to the RFC 2822 and the email header is an index used for indexing the email message that is stored separately;

wherein the one or more primary database devices and the one or more secondary database devices are used to store plurality of the email headers;

wherein the one or more secondary database devices serve as a backup database of the one or more primary databases;

using a log shipping process to replicate email headers from at least one of the primary database devices to at least one of the secondary database devices to eliminate a single point of failure;

issuing at least one or more email-related requests by the one or more email clients;

executing, by a load balancer, a load balancing algorithm to forward at least one or more email-related requests and to select at least one or more stateless protocol servers available to ensure the one or more email-related requests are serviced;

each email-related request includes: an email, port assignments, number of sockets per server, worker threads, buffer sizes, physical storage address of each email client, and email client capacity data;

using each stateless protocol server to parse one or more email-related requests by separating the email header and the email message that are in each email contained in one or more email-related requests;

using each stateless protocol server to store the email header in the one or more primary database devices and to store the email message to one or more file share devices;

setting a state of the email header to a committed state as the email message is successfully written into the one or more file share devices;
retrieving addresses that correspond to the email-related request or a requesting email clients for each of the one or more primary database devices and each of one or more file share devices;
using the retrieving addresses by the one or more stateless protocol servers to access the one or more primary database devices and accessing one or more file share devices;
wherein maintaining at least two copies of the email headers on the at least one of the file share devices to ensure a higher availability for a specific group of email clients that have a particular class of service;
accessing a primary database, using a request to retrieve an email, to retrieve a header corresponding to the email;
accessing a file share, using the retrieved header, to retrieve a message corresponding to the email;
wherein there is a logical and physical difference in respective addresses between the primary database and the file share;
wherein the set of metadata in each email header includes data from a group consisting of a transaction state, a sender of the email, a subject of the email, a receipt date of the email, a size of the email message, an email recipient preference, email folder hierarchy data, a rule for filtering of the email message, an identification of an email recipient, a globally unique identifier of the email message, and a timestamp of when the email header was last modified.

13. The method as defined in claim 12, wherein:
the header is replicated from the primary database to a secondary database; and
there is a logical and physical difference in respective addresses between the primary and secondary databases.

14. The method as defined in claim 12, wherein:
the message is replicated into each of a plurality of said file shares; and
there is a logical and physical difference in respective addresses between each of the primary database and each said file share.

15. The method as defined in claim 12, further comprising:
receiving, at one of a plurality of protocol servers, the request to retrieve the email, wherein the email includes a unique identifier for one of a plurality of users;
retrieving, at the one said protocol server, an address for each of the primary database and the file share, wherein the one said protocol server uses each said address to perform:
the accessing of the primary database to retrieve there from the header corresponding to the email at an address corresponding to the one said user within an attached storage device in communication with the primary database; and
the accessing of the file share to retrieve there from the message corresponding to the email at an address corresponding to the one said user within an attached storage device in communication with the file share.

16. The method as defined in claim 12, further comprising:
receiving, at one of a plurality of front doors, the request to retrieve the email, wherein each said front door stores information about a plurality of users;
determining with the one said front door, from a unique identifier for one said user included with the request to retrieve the email, whether the one said user exists; and when the determining finds that the one said user exists:
sending the request from the one said front door to one of a plurality of load balancers;
performing a load balancing analysis at the one said load balancer to determine one of a plurality of protocol servers to receive the request to retrieve the email;
receiving the request to retrieve the email at the one said protocol server;
retrieving, at the one said protocol server, an address for each of the primary database and the file share, wherein the one said protocol server uses each said address to perform:
the accessing of the primary database to retrieve the header corresponding to the email; and
the accessing the file share to retrieve the message corresponding to the email.

17. The method as defined in claim 16, wherein:
the header is replicated from an attached storage device in communication with the primary database into an attached storage device in communication with a secondary database;
the message is replicated from an attached storage device in communication with the file share into an attached storage device respectively corresponding to each of a plurality of said file shares;
there is a logical and physical difference in respective addresses between each of the primary database, the secondary database, and each said file share.

18. A computer readable medium that is in a form of a volatile memory and comprising computer readable instructions executed by one or more hardware processors, performs the method of claim 12.

19. An email system comprising:
one or more of primary database devices, one or more plurality of secondary database devices, one or more file sharing devices and a topological data storage device implemented for one or more email clients on a distribution network;
wherein each of the one or more of primary database devices, the one or more plurality of secondary database devices, the one or more file sharing devices, the topological data storage, the one or more email clients comprising a hardware processor;
wherein each email within the network includes an email header and an email message;
wherein the email header comprises a set of metadata corresponding to the RFC 2822 and the email header is an index used for indexing the email message that is stored separately;
wherein the one or more primary database devices and the one or more secondary database devices are used to store plurality of the email headers;
wherein the one or more secondary database devices serve as a backup database of the one or more primary databases;
a messaging protocol to maintain consistency in data for a database device and a file share device;
a log shipping process to replicate email headers from at least one of the primary database devices to at least one of the secondary database devices to eliminate a single point of failure;
wherein maintaining at least two copies of the email headers on the at least one of the file share devices to ensure a higher availability for a specific group of email clients that have a particular class of service;
load balancers distributing email related requests over the set of protocol servers, wherein the load balancers execute a load balancing algorithm to forward at least one or more email-related requests and to select at least one or more stateless protocol servers available to ensure the one or more email-related requests are serviced;

wherein each email-related request includes: an email, port assignments, number of sockets per server, worker threads, buffer sizes, physical storage address of each email client, and email client capacity data;

wherein each stateless protocol server is used to parse one or more email-related requests by separating the email header and the email message that are in each email contained in one or more email-related requests and to store the email header in the one or more primary database devices and to store the email message to one or more file share devices;

the set of protocol servers separating an email header corresponding to a plurality of emails and a message corresponding to the email header;

a plurality of header host computing devices each having an attached database device for storing an email header corresponding to a respectively plurality of emails, wherein the email header is stored separately from the message of the email;

another database device log shipping the email header to another database device, wherein the plurality of headers in the another database device act as respective indices to the set of messages in a message file server host;

a plurality of message host computing devices each having an attached file share device for storing, in a separate file, a message that corresponds to a respective one header that is stored separately in an attached storage device of one header host computing device;

wherein setting a state of a retrieved header of the email message to a committed state as the email message is successfully written into the one or more file share devices;

wherein addresses that correspond to the email-related request or a requesting email clients for each of the one or more primary database devices and each of one or more file share devices are retrieved and the retrieved addresses are used by the one or more stateless protocol servers to access the one or more primary database devices and accessing one or more file share devices; and wherein the set of metadata in each email header includes data from a group consisting of a transaction state, a sender of the email, a subject of the email, a receipt date of the email, a size of the email message, an email recipient preference, email folder hierarchy data, a rule for filtering of the email message, an identification of an email recipient, a globally unique identifier of the email message, and a timestamp of when the email header was last modified;

wherein each said stateless protocol server uses a messaging protocol by which consistency in email header is maintained between the one or more of primary database devices and one or more plurality of secondary database devices.

20. The email system as defined in claim 19, wherein each said message and each said header include a unique identifier for a recipient of the corresponding said email.

21. The email system as defined in claim 19, further comprising a plurality of protocol host computing devices each being in communication for inserting, retrieving, modifying, and deleting email data at each of:
the plurality of header host computing devices; and
the plurality of message host computing devices.

22. The email system as defined in claim 21, wherein each said protocol host computing device uses a messaging protocol by which equivalent email header data is maintained between the plurality of header host computing devices.

23. A method implemented on a computing device, comprising computer readable instructions executed on the computing device, in answer to a request to retrieve an email, for communication over a packet switched network, the method comprising:

implementing one or more of primary database devices, one or more plurality of secondary database devices, one or more file sharing devices and a topological data storage device implemented for one or more email clients on a distribution network;

wherein each email within the network includes an email header and an email message;

wherein the email header comprises a set of metadata corresponding to the RFC 2822 and the email header is an index used for indexing the email message that is stored separately;

wherein the one or more primary database devices and the one or more secondary database devices are used to store plurality of the email headers;

wherein the one or more secondary database devices serve as a backup database of the one or more primary databases;

using a log shipping process to replicate email headers from at least one of the primary database devices to at least one of the secondary database devices to eliminate a single point of failure;

issuing at least one or more email-related requests by the one or more email clients;

executing, by a load balancer, a load balancing algorithm to forward at least one or more email-related requests and to select at least one or more stateless protocol servers available to ensure the one or more email-related requests are serviced;

each email-related request includes: an email, port assignments, number of sockets per server, worker threads, buffer sizes, physical storage address of each email client, and email client capacity data;

using each stateless protocol server to parse one or more email-related requests by separating the email header and the email message that are in each email contained in one or more email-related requests;

using each stateless protocol server to store the email header in the one or more primary database devices and to store the email message to one or more file share devices;

setting a state of the email header to a committed state as the email message is successfully written into the one or more file share devices;

retrieving addresses that correspond to the email-related request or a requesting email clients for each of the one or more primary database devices and each of one or more file share devices;

using the retrieving addresses by the one or more stateless protocol servers to access the one or more primary database devices and accessing one or more file share devices;

wherein maintaining at least two copies of the email headers on the at least one of the file share devices to ensure a higher availability for a specific group of email clients that have a particular class of service;

using an email header corresponding to the email and derived from data stored in one of a plurality of attached database devices that are each in communication with one of a respective plurality of header host computing devices and at which the email headers of respective emails are stored;

using an email message corresponding to the email and derived from data stored in a separate file in one of a plurality of attached file share devices that are each in communication with one of a respective plurality of message host computing devices and at which the email messages of respective emails are stored;

wherein each of the email header and the email message are packetized for transmission over the packet switched network;

wherein the set of metadata in each email header includes data from a group consisting of a transaction state, a sender of the email, a subject of the email, a receipt date of the email, a size of the email message, an email recipient preference, email folder hierarchy data, a rule for filtering of the email message, an identification of an email recipient, a globally unique identifier of the email message, and a timestamp of when the email header was last modified;

wherein each said stateless protocol server uses a messaging protocol by which consistency in email header is maintained between the one or more of primary database devices and one or more plurality of secondary database devices.

24. The method as defined in claim 23, wherein the email header and the email message are derived from different server farms at which they are redundantly stored.

25. The method as defined in claim 23, wherein the email message and the email header both include a unique identifier for an email recipient.

26. A protocol host computing device comprising:
a hardware processor;
a log shipping process to replicate email headers from at least one of primary database devices to at least one of secondary database devices to eliminate a single point of failure;
wherein each email within a network includes an email header and an email message;
wherein the email header comprises a set of metadata corresponding to the RFC 2822 and the email header is an index used for indexing the email message that is stored separately;
wherein the one or more primary database devices and the one or more secondary database devices are used to store plurality of the email headers;
wherein the one or more secondary database devices serve as a backup database of the one or more primary databases;
hardware means for issuing at least one or more email-related requests by one or more email clients and executing, by a load balancer, a load balancing algorithm to forward at least one or more email-related requests and to select at least one or more stateless protocol servers available to ensure the one or more email-related requests are serviced;
wherein each email-related request includes: an email, port assignments, number of sockets per server, worker threads, buffer sizes, physical storage address of each email client, and email client capacity data;
hardware means for using each stateless protocol server to parse one or more email-related requests by separating the email header and the email message that are in each email contained in one or more email-related requests and using each stateless protocol server to store the email header in the one or more primary database devices and to store the email message to one or more file share devices;
hardware means for setting a state of the email header to a committed state as the email message is successfully written into the one or more file share devices;
hardware means for retrieving addresses that correspond to the email-related request or a requesting email clients for each of the one or more primary database devices and each of one or more file share devices and using the retrieving addresses by the one or more stateless protocol servers to access the one or more primary database devices and accessing one or more file share devices;
wherein maintaining at least two copies of the email headers on the at least one of the file share devices to ensure a higher availability for a specific group of email clients that have a particular class of service;
a fixed storage for storing an email including an email header and an email message;
hardware means for transmitting the email header for storage at each of a plurality of attached database devices that are each in communication with one of a respective plurality of header host computing devices;
hardware means for transmitting the email message in a separate file in a plurality of attached file share devices that are in communication with one of a respective plurality of message host computing devices;
hardware means for including data from the email header, the email header comprises an identity of a sender of the email, a subject of an email, a date the email was received, a size of a message of the email, email recipient preferences, email folder hierarchy data, and rules for filtering email messages
wherein each said stateless protocol server uses a messaging protocol by which consistency in email header is maintained between the one or more of primary database devices and one or more plurality of secondary database devices.

27. The protocol host computing device as defined in claim 26, wherein:
the email includes a unique identifier for one of a plurality of email recipients; and
the method further comprising:
hardware means for inserting, retrieving, modifying, and deleting email data at each of:
the plurality of email header host computing devices at the address corresponding to the one said email recipient; and
the plurality of message host computing devices at the address corresponding to the one said email recipient.

* * * * *